US012794323B2

(12) United States Patent
Aren

(10) Patent No.: US 12,794,323 B2
(45) Date of Patent: Nov. 10, 2026

(54) GENERATOR POLE SLIP PROTECTION WITH AUXILIARY WINDING MEASUREMENT

(71) Applicant: Caterpillar Energy Solutions GmbH, Mannheim (DE)

(72) Inventor: Assiet Aren, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 134 days.

(21) Appl. No.: 18/875,817

(22) PCT Filed: Jun. 13, 2023

(86) PCT No.: PCT/EP2023/025282
§ 371 (c)(1),
(2) Date: Dec. 17, 2024

(87) PCT Pub. No.: WO2023/241825
PCT Pub. Date: Dec. 21, 2023

(65) Prior Publication Data

US 2025/0183764 A1 Jun. 5, 2025

(30) Foreign Application Priority Data

Jun. 17, 2022 (GB) ...................................... 2208940

(51) Int. Cl.
*H02K 11/22* (2016.01)
*H02K 11/225* (2016.01)
*H02P 9/00* (2006.01)

(52) U.S. Cl.
CPC ............ *H02K 11/225* (2016.01); *H02P 9/006* (2013.01); *H02P 9/009* (2013.01)

(58) Field of Classification Search
CPC ..... H02K 11/225; H02K 11/20; H02P 25/022; H02P 29/024; H02P 29/032; H02P 9/006; H02P 9/009
See application file for complete search history.

(56) References Cited

U.S. PATENT DOCUMENTS 3,378,744 A 4/1968 Seymour
3,525,026 A 8/1970 Ahamed
(Continued)

FOREIGN PATENT DOCUMENTS

EP 2118996 B1 8/2011
EP 3213096 B1 8/2018
(Continued)

OTHER PUBLICATIONS

Great Britain Search Report related to application No. 2208940.3; reported on Nov. 2, 2022.
(Continued)

*Primary Examiner* — Naishadh N Desai

(57) ABSTRACT

The present invention pertains to a method for detecting an onset of a pole slip in a generator as well as a corresponding control unit and generator, in particular to predict a pole slip prior to an actual occurrence of a pole slip in order to enable required safety measures. Accordingly, a method for detecting an onset of a pole slip in a generator is suggested, comprising the steps of detecting subsequent zero cross points from a voltage measurement received from said generator and determining a voltage phase by interpolating said zero cross points. The voltage measurement is received from an auxiliary winding of the rotor that is electrically isolated from the main windings of the rotor, wherein a relative rotor angle is determined based on the determined voltage phase of the auxiliary winding and a relative voltage phase change of the main windings. A signal is output, when
(Continued)

a relative rotor angle change is determined that exceeds a predefined angle change threshold.

15 Claims, 4 Drawing Sheets

(56) References Cited

U.S. PATENT DOCUMENTS

| | | | | |
|---|---|---|---|---|
| 5,808,441 | A | 9/1998 | Nehring | |
| 6,525,504 | B1 | 2/2003 | Nygren et al. | |
| 9,594,091 | B2 | 3/2017 | Niedrist | |
| 11,258,394 | B2 | 2/2022 | Fahringer et al. | |
| 2010/0039077 | A1 * | 2/2010 | Dalby | H02P 9/302<br>322/89 |
| 2013/0168960 | A1 * | 7/2013 | Kalinka | H02P 9/006<br>290/7 |
| 2016/0187425 | A1 * | 6/2016 | Fahringer | H02P 29/0241<br>322/99 |

FOREIGN PATENT DOCUMENTS

| | | | |
|---|---|---|---|
| GB | 1215217 | A | 12/1970 |
| GB | 2591868 | A | 8/2021 |
| WO | 2013102849 | A2 | 7/2013 |
| WO | 2018185667 | A1 | 10/2018 |

OTHER PUBLICATIONS

International Search Report related to application No. PCT/EP2023/025282; reported on Sep. 8, 2023.

* cited by examiner

GENERATOR POLE SLIP PROTECTION WITH AUXILIARY WINDING MEASUREMENT

CROSS-REFERENCE TO RELATED APPLICATION

This Application is a 35 USC § 371 US National Stage filing of International Application No. PCT/EP2023/025282 filed on Jun. 13, 2023 which claims priority under the Paris Convention to Great Britain Patent Application No. 2208940.3 filed on Jun. 17, 2022.

TECHNICAL FIELD

The present invention pertains to a method for detecting an onset of a pole slip in a generator as well as a corresponding control unit and generator, in particular to predict a pole slip prior to an actual occurrence of a pole slip in order to enable required safety measures.

TECHNOLOGICAL BACKGROUND

A generator is typically part of a generator set and is formed as an electric machine configured to convert mechanical rotation into electrical energy. The electrical energy is generated by electromagnetic interactions caused by main windings on a rotor of the generator and may be used for a variety of applications. One large scale application includes power generation for a power grid, wherein the grid defines a load connected to the generator.

In order to provide sufficient functional stability for such power grid, the operation of the generator or generator set needs to be essentially in synchronization with the actual load of the grid. However, conditions such as low excitation, abrupt load change, or even faults in the circuits may cause the poles in the generator to become out of step, a condition often referred to as “pole slip.” Such pole slipping will cause damage to generator components and may also lead to an instability in power generation. Contrary to occasionally occurring power swings or fluctuations, which typically occur only temporarily, instabilities caused by pole slip conditions tend to progress and may eventually lead to a malfunctioning of the generator set and a corresponding power outage.

Since pole slip furthermore occurs and progresses rapidly, corresponding countermeasures need to be effected as soon as possible in order to avoid severe damage to the system. In order to reduce the risk of detecting a pole slip in a state, wherein the condition of the generator set is already outside a stabile operating range, pole slip protection methods have been developed, but such methods are often still not sufficient to detect the first pole slip before it occurs. Moreover, current detection methods may be difficult to implement and are associated with high installation costs based e.g. on required sensory equipment.

Accordingly, there is a need to provide an early detection of the occurrence of a pole slip, in particular one that is easily implemented and adapted to the respective generator and power grid requirements.

SUMMARY OF THE INVENTION

Starting from the prior art, it is an objective to provide a new and inventive method for detecting the early occurrence of a pole slip in a generator. In particular, it may be an objective to provide a method which enables the prediction of a pole slip before it occurs in a reliable manner and allowing sufficient time to perform safety measures to maintain functionality of the generator and a coupled grid.

This objective is solved by means of a method for detecting the onset of a pole slip with the features of claim 1. Preferred embodiments are set forth in the present specification, the Figures as well as the dependent claims.

Accordingly, a method for detecting an onset of a pole slip in a generator is suggested, comprising the steps of detecting subsequent zero cross points from a voltage measurement received from said generator, and determining a voltage phase by interpolating said zero cross points. The voltage measurement is received from an auxiliary winding of the rotor that is electrically isolated from the main windings of the rotor and wherein a relative rotor angle is determined based on the determined voltage phase of the auxiliary winding and a relative voltage phase change of the main windings. When a relative rotor angle change is determined that exceeds a predefined angle change threshold, a signal is output.

Furthermore, a control unit for controlling a generator is suggested, comprising an interface for receiving, in a coupled state of the control unit and the generator, at least a voltage measurement from an auxiliary winding of the generator and comprising an evaluation unit in communication with the interface and configured to perform the method according to the invention.

In a further aspect, a generator is suggested, comprising main windings and an electrically isolated auxiliary winding and comprising a corresponding control unit.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
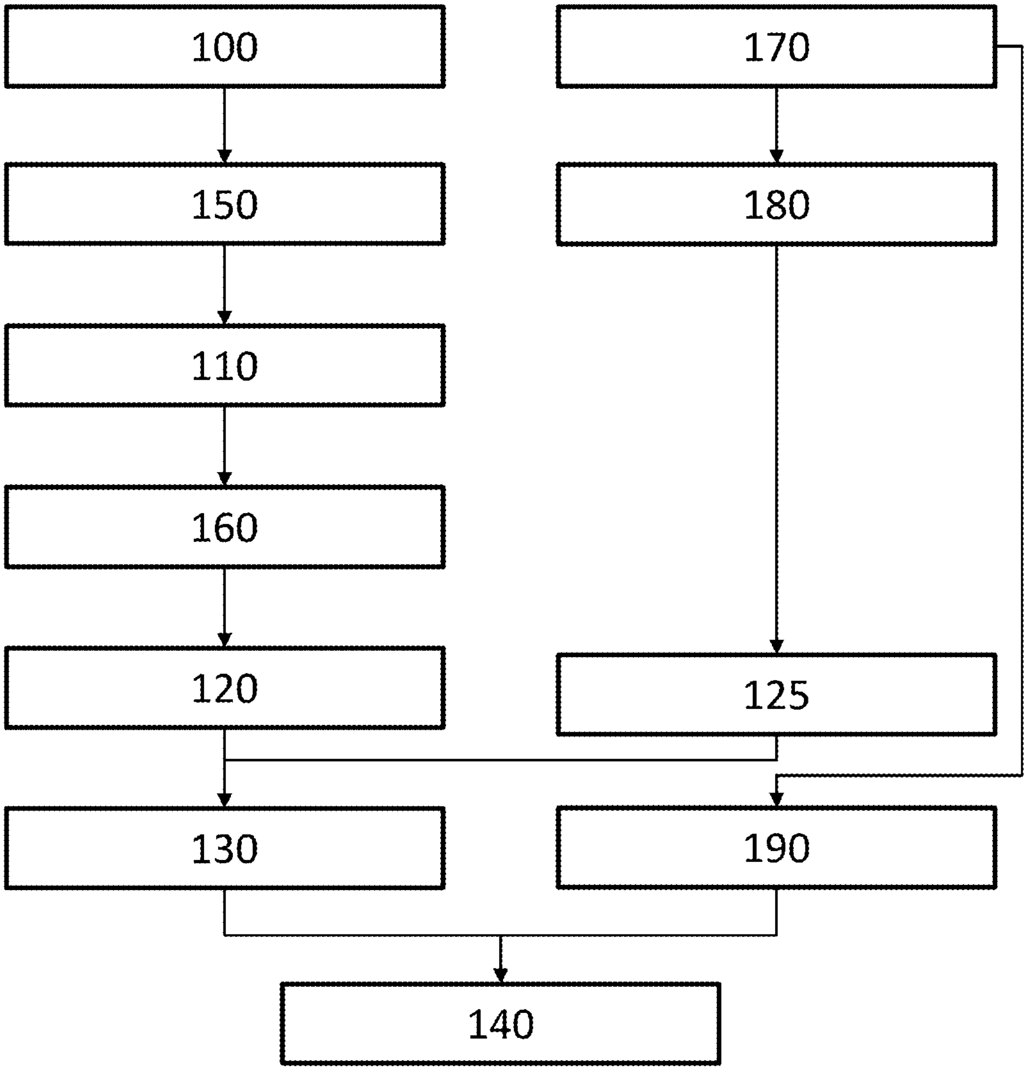
FIG. 1 schematically depicts various steps of the method according to the invention for detecting an onset of a pole slip in a generator.

In the following, the invention will be explained in more detail with reference to the accompanying figures. In the Figures, like elements are denoted by identical reference numerals and repeated description thereof may be omitted in order to avoid redundancies.

In FIG. 1 various steps are schematically depicted that enable the accurate and timely detection of an onset of a pole slip in a generator. Accordingly, in a first step 100, a voltage measurement is received from an auxiliary winding that is mechanically coupled to the rotor of the generator and preferably comprises a torque coupling to the main winding of said rotor. However, the auxiliary winding is electrically isolated from the main windings of the rotor, such that the obtained voltage measurement, preferably a continuous measurement, is electrically independent from voltages provided by the main winding.

The voltage measurement is then used to detect subsequent zero crossings in step 110, typically corresponding to a phase change of the measurement signal, as shown e.g. below in view of FIG. 5. Based on the detected zero cross points, an interpolation is performed in step 120, such that a phase may be determined for time points between the zero cross points, as explained in further detail e.g. in view of FIG. 4 below. From the determined phase of the auxiliary winding and a relative phase change of the main winding, which is obtained in step 125, a relative rotor angle is then determined in step 130.

As described above, changes in said relative rotor angle may be indicative for the onset or early development of a pole slip. Accordingly, the changes of the relative rotor angle may be compared with a predefined threshold, wherein a sudden relative rotor angle change, i.e. corresponding to a large rate of change, may exceed said predefined threshold and may hence be considered as an early indicator for the development of a pole slip. In order to avoid or at least reduce corresponding damage, a signal may be output, e.g. to a safety chain protector of a main controller, when said threshold is exceeded, such that operational functionality of the generator and a coupled grid may be essentially maintained.

In the embodiment, the relative phase change that is obtained in step 125 is optionally determined using a voltage measurement received from the main windings in optional step 170. Such relative phase change may be calculated using Clarke transformation, based e.g. on three alternating phases of the measurement signal that correspond to the respective main windings.

Both the measurement signal received from the auxiliary winding in step 100 and the measurement signal received from the main windings in step 170 may furthermore be corrected using a first level filter in steps 150 and 180. The first level filter according to the embodiment is designed as a low-pass filter, such that high frequency harmonics may be effectively corrected and the measurement signal may be smoothened. In such manner, small fluctuations may be corrected in order to avoid the occurrence of multiple zero crossings about the same time point, as explained e.g. in view of FIG. 6.

The corrected measurement signal of the auxiliary winding may then optionally be further processed after the zero cross detection by applying a second level filter. The second level filter according to the embodiment defines a threshold interval, wherein one or more detected zero cross points subsequent to a prior zero cross point may e.g. be removed prior to the interpolation and phase calculation step 120 and the determining of the relative rotor angle in step 130.

In addition to the relative rotor angle change and the comparison with a predefined threshold for such rate of change, the method may furthermore optionally include the determining of an absolute rotor angle in step 190 based on the received voltage measurement of the main winding in step 170 and a received current measurement. The absolute rotor angle may have larger tolerances, depending on the generator characteristics and/or the grid safety requirements yet forms a redundant safety measure, e.g. in case a sudden rotor change angle is not present, but an increase of the absolute rotor angle gradually reaches an acceptable ceiling level.

Figure 2:
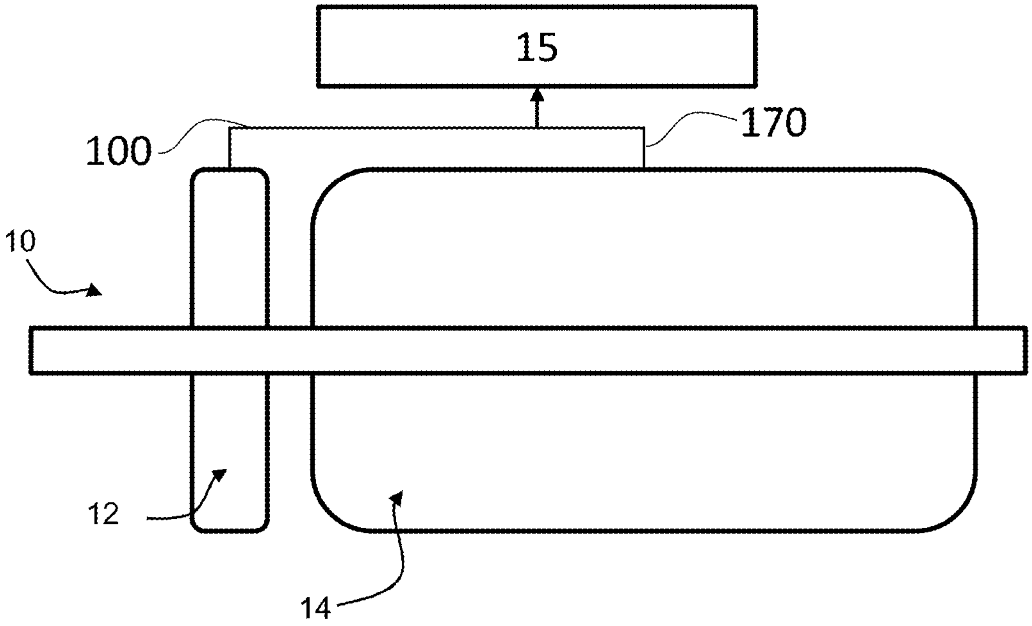
FIG. 2 schematically depicts components of a generator having an auxiliary winding.

In FIG. 2 components of a generator are schematically depicted. Accordingly, a rotor 10 is provided, which in an implemented state of the generator in a generator set may be rotated, e.g., using a prime mover. The rotor 10 comprises a main winding 14, which upon rotation generates power based on electromagnetic interactions with a corresponding stator surrounding the rotor 10 in a coupled state in a generator. Also attached to the rotor 10 is an auxiliary winding 12, which may be configured to generate a single voltage phase and is electrically isolated from the main winding(s) 14. From the auxiliary winding 12 and the main winding 14, a respective voltage measurement 100, 170 may be received by a control unit 15, e.g. via a corresponding interface. Said voltage measurement may then be used to determine a relative rotor angle, e.g. in an evaluation unit of the control unit 15.

Figure 3:
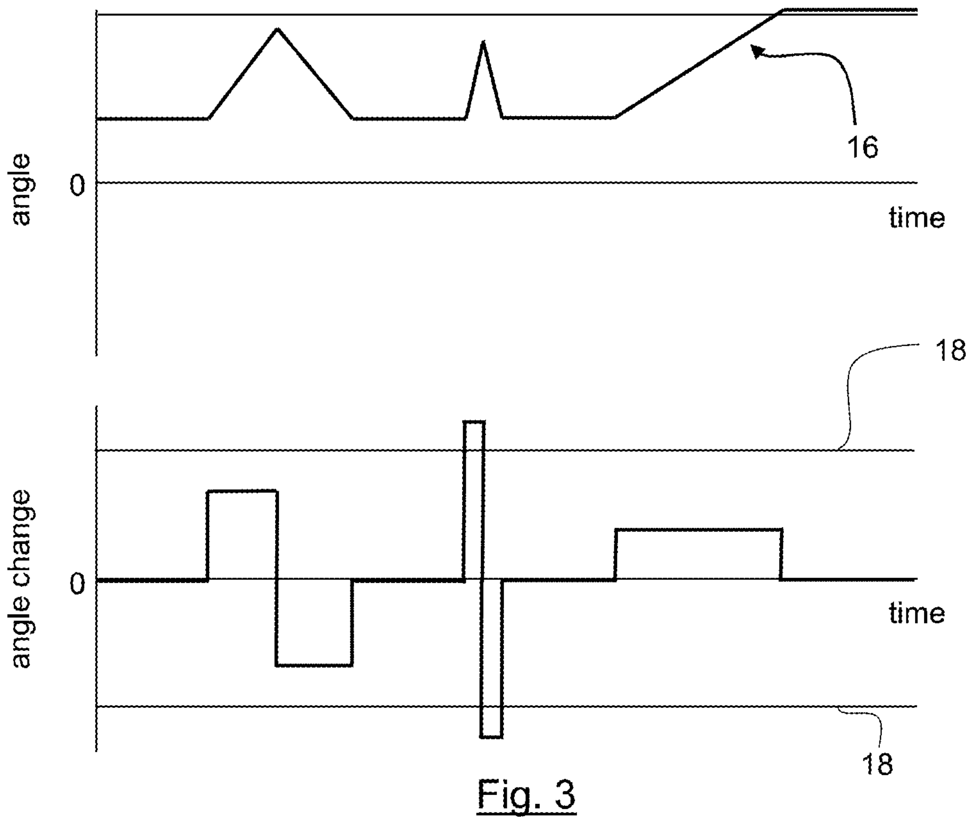
FIG. 3 depicts a determined relative rotor angle and a corresponding change over time.

A determined relative rotor angle 16 is depicted in FIG. 3 for a period of time. According to the present example, a steady-state relative rotor angle of between 30 and 45 degrees is determined during normal operation, wherein negligibly small fluctuations may be present. At one time point, a change in the relative rotor angle is determined, as shown by the increase of the relative rotor angle in the upper panel and which subsequently decreases to the previously determined relative rotor angle. As shown in the upper panel, said increase does not exceed an absolute angle threshold, which is indicated with the dashed line. Moreover, the change also does not exceed a threshold 18 set for the relative rotor angle change, which is indicated with the corresponding dashed line in the lower panel. As shown, the first change corresponds to a positive and subsequent negative change rate before said change rate levels back to 0, e.g. 0 degrees per second. Neither the positive change rate nor the negative change rate exceeds said threshold 18, such that no signal needs to be output.

Subsequently, another change in the relative rotor angle is determined. Said absolute angle again does not exceed a predefined threshold. However, the change occurs more rapidly, such that the corresponding change rate depicted in the lower panel is larger and accordingly exceeds the predefined threshold 18. It may hence be determined that a critical change rate is present, which may correspond to the onset of an occurring pole slip. Accordingly, a signal may be output to prevent such (first) pole slip from occurring. In the example, the determined relative rotor angle 16 is lower compared with the previous change, but the sudden change rate may still indicate a critical condition of the generator. However, it is to be understood that the second determined relative angle change may also correspond to a relative angle being larger than the first angle change.

Following the rapid angle change rate, another change is depicted illustrating that even in the case of a lower change rate an absolute relative angle threshold, indicated in the above panel by the dashed line, may be exceed. Such additional threshold may provide a level of redundancy and/or may provide an indication of a slowly developing operating condition being outside of a predefined range.

In the present example, the predefined angle change threshold may preferably be between 5 degrees per second and 11 degrees per second. The threshold may be based on simulated and/or validated data.

Figure 4:
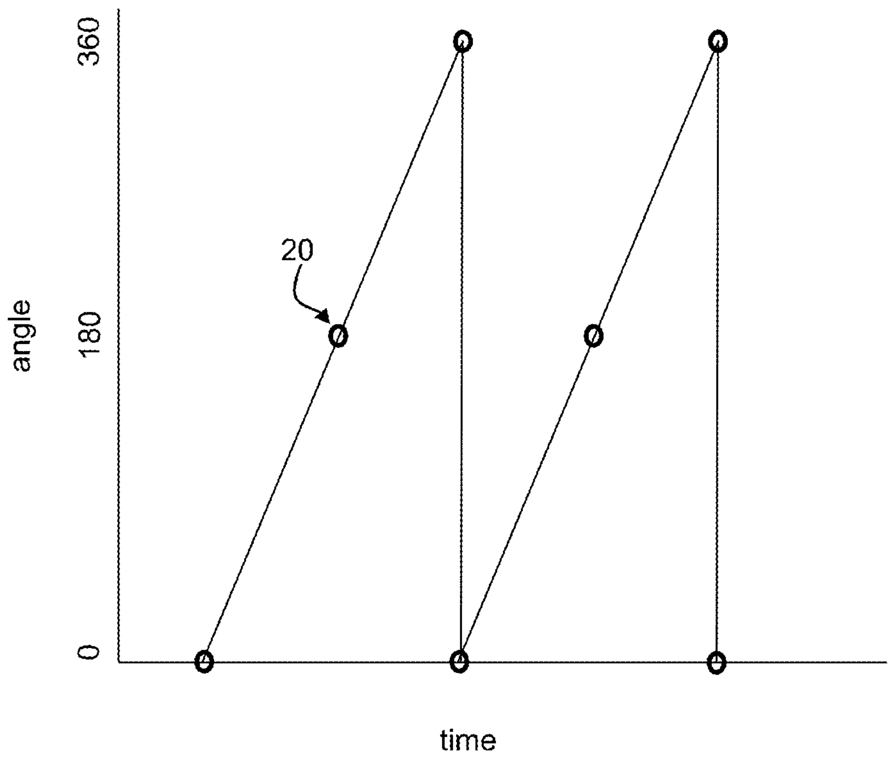
FIG. 4 schematically shows a linear interpolation of subsequent zero cross points.

In FIG. 4 a linear interpolation of subsequent zero cross points 20 is shown, wherein the detected zero cross points 20 are assumed to correspond to a subsequent rotor angle of 0 degrees, 180 degrees and 360 degrees. Based on the linear interpolation, rotor angles may be assumed for time points between the respective zero cross points 20, such that a relative rotor angle may be determined for any time point.

Figure 5:
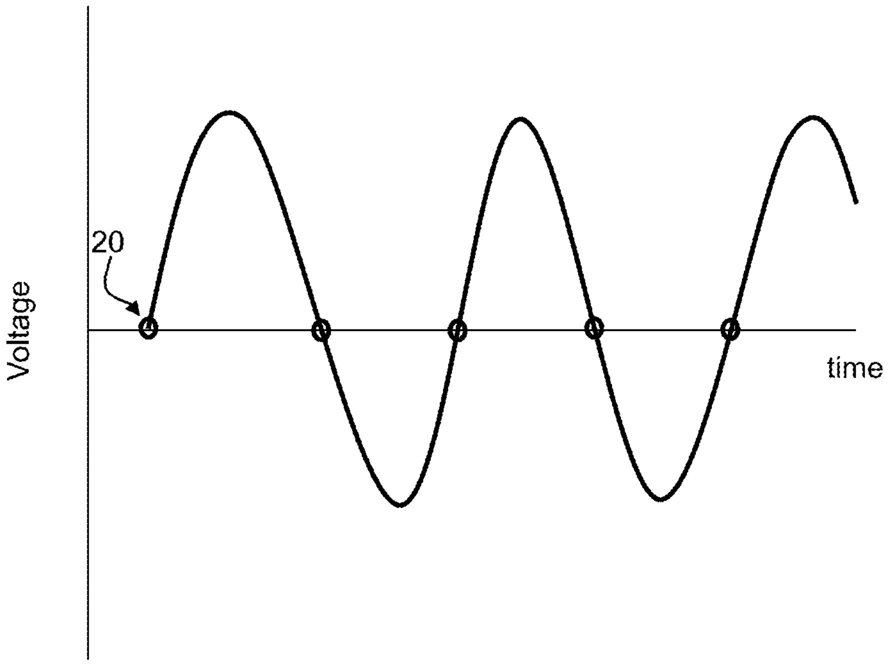
FIG. 5 schematically shows the occurrence of subsequent zero crossings for an ideal voltage measurement signal.

The voltage measurement received from the auxiliary winding is depicted in FIG. 5 as an ideal signal, wherein the occurrence of subsequent zero cross points 20 is depicted at the zero voltage line and for corresponding phase changes. In reality, such signal may comprise noise, which may render the detection of the zero cross points difficult or diminish the validity of the determined relative rotor angle.

Figure 6:
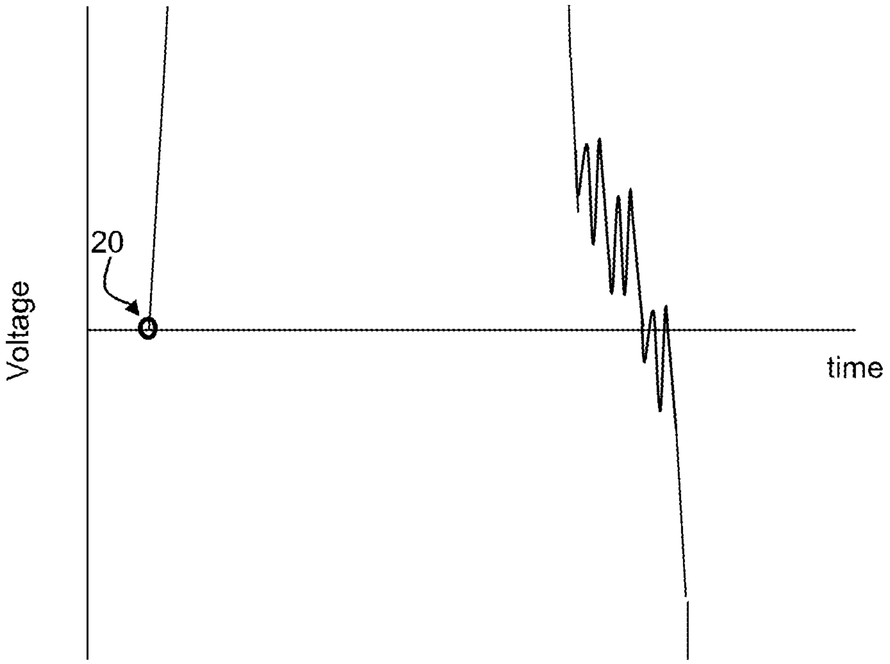
FIG. 6 schematically shows measurement signal noise and a zero crossing about a time point.

An example of such noise is shown in FIG. 6, which schematically shows measurement signal noise and a zero crossing 20 for two subsequent zero crossings 20, wherein the graph is zoomed-in in comparison with FIG. 5. The signal noise may be caused e.g. by currents generated by an automated voltage regulator, which may be present in the generator, and result in high frequency harmonics as an artefact within the measurement signal. In order to reduce said high frequencies, a low-pass filter may be implemented as a first level filter and/or a moving average for subsequent measurement points may be provided to smoothen the signal and optimize the signal resolution. Accordingly, the variations around the time point indicated on the right hand side may be significantly reduced, such that only a single zero cross point may be detected.

Figure 7:
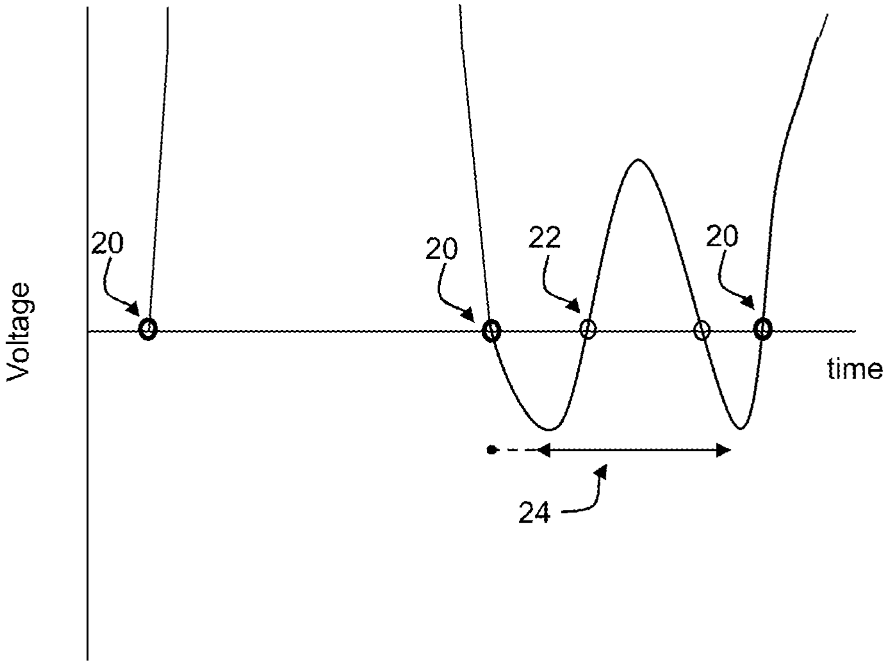
FIG. 7 schematically shows alternative measurement signal noise and corresponding intermediate zero crossings about a time point.

Such smoothening or filtering is not possible and/or not desirable for the situation depicted in FIG. 7, wherein the measurement signal comprises large deviations about a single time point, as shown on the right side of the Figure. Here, a prior zero cross point 20 is depicted on the left side of the graph. However, after the subsequent zero cross point, a number of intermediate zero cross points 22 are detected, as also indicated with the dashed circles rather than the solid circles of the zero cross points 20. The large variations cannot be merely attributed to harmonics caused e.g. by currents from an automated voltage regulator. In order to exclude erroneous measurements, a second level filter may be applied, which defines a temporal threshold 24.

In the present example, the threshold 24 is defined as an interval, which is indicated with the double arrowheads. The interval defines which subsequent zero crossings are to be removed or may be used for outputting the signal, which in the present example applies to the two intermediate zero cross points 22. On the other hand, measurement signals and corresponding zero crossings prior to the interval and subsequent to a prior zero cross point 20 are not excluded, as indicated with the dashed line, so as to maintain functionality upon detection of a fault ride through, for example. The threshold 24 may be chosen based on known artefacts and corresponding amplitudes and/or time intervals.

By removal of the intermediate zero cross points 22, the validity of the determined relative rotor angle may be improved. However, instead of removal of said intermediate zero cross points 22, the detection of these intermediate zero cross points may also result in the outputting of the signal, for example, if a predefined number of intermediate zero crossings 22 is detected within the threshold interval 24 and/or a predefined voltage measurement amplitude is exceeded within said threshold interval 24.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

Accordingly, a method for detecting an onset of a pole slip in a generator is suggested.

The method comprises the steps of detecting subsequent zero cross points from a voltage measurement received from said generator and determining a voltage phase by interpolating said zero cross points, wherein the voltage measurement is received from an auxiliary winding of the rotor that is electrically isolated from the main windings of the rotor and wherein a relative rotor angle is determined based on the determined voltage phase of the auxiliary winding and a relative voltage phase change of the main windings. A signal is output, when a relative rotor angle change is determined that exceeds a predefined angle change threshold.

By means of the auxiliary winding, which may be mechanically coupled to the rotor yet is electrically isolated from the main windings, an additional voltage measurement may be obtained that is essentially independent from the main windings. Thereby, small changes may be more readily detected and a difference or delta between the voltage phase of the auxiliary winding and the voltage phase of the main windings may be used as a measure for the onset of a potential pole slip. That is, the voltage phases are indicative for a rotor angle difference and abnormal changes in the relative rotor angle may enable a prediction of a developing pole slip, i.e. the onset of the pole slip, before such pole slip has actually occurred.

For example, during steady state or normal operation, the difference or relative rotor angle may have a value corresponding to the operating state of the generator or generator set and the load, e.g. of a coupled grid. Even in case of larger differences, such difference may not pose significant problems to the functionality and/or stability of the generator. However, a larger sudden change of the relative angle over time, i.e. a rate of change, may indicate an inconsistency and potential detrimental condition affecting the stability of the generator. Should a predefined threshold for such rate of change, which may be based e.g. on grid requirements and/or the generator characteristics, be exceeded, the early onset of a pole slip may be determined before such pole slip has actually occurred.

The auxiliary winding measurement, which may be received continuously or periodically, hence enables the accurate detection of an abnormal increase of angle difference between the main winding voltage and an auxiliary winding voltage. The generator or generator set may thus be effectively protected against pole slip and potential damage may be avoided while grid code requirements are fulfilled. The mere requirement of the auxiliary winding measurement and the simplified method steps, e.g. by means of a corresponding algorithm, may furthermore provide a monitoring and/or protection method that is easily implemented in a cost efficient manner.

The determined voltage phase of the auxiliary winding and the relative voltage phase change of the main windings are furthermore provided for the same time point, such that said phases may be essentially simultaneously obtained and the relative rotor angle is determined with a predefined temporal resolution, e.g. between one millisecond and one second, preferably between 10 milliseconds and 50 milliseconds.

Preferably, the angle change threshold is a value between 0.5 degrees and 15 degrees per second, more preferably between 3 degrees and 12 degrees per second, in particular between 5 degrees and 9 degrees per second.

For example, for a steady-state or normal operation of a generator, a relative angle difference may be between 30 degrees and 50 degrees, e.g. between 35 degrees and 40 degrees, wherein a threshold for a rate of change between 5 degrees and 9 degrees per second has been found to be particularly advantageous. Lower values, e.g. of between 0.5 degrees and 3 degrees per second may provide a higher resolution and sensitivity with regard to the prediction of a pole slip occurrence while higher values, e.g. of between 12 degrees and 15 degrees per second provide that even larger changes may still be found as acceptable, for example, if a safety chain mechanism with a corresponding fast reaction time is implemented.

Alternatively, or in addition, the angle change threshold value per second may also be a predefined percentage of a steady-state relative rotor angle during normal operation of the generator, preferably between 1 percent and 40 percent, in particular between 15 percent and 30 percent.

The predefined percentage may be advantageous e.g. for different operating conditions and/or different generator or generator set characteristics, wherein the percentage may be variable depending on the actual condition and/or characteristics. For example, the percentage may be between 15 percent and 30 percent for a steady state relative rotor angle between about 35 degrees and 45 degrees, resulting in a threshold of the change rate between about 7 degrees and 11 degrees per second. A generator having a relative rotor angle between about 25 degrees and 35 degrees during normal operation and/or having a lower relative rotor angle, e.g. during initial start-up, may accordingly have lower threshold values, such that a predefined sensitivity of the determining of the onset of a pole slip is provided, which may be dependent on the operating state.

The predefined threshold may at least in part be based on previously obtained and evaluated data. Preferably, said threshold is based on simulated and validated data, which is adapted to the particular generator and/or operating conditions. In this manner, a more specific threshold may be provided and/or said threshold may be chosen with a corresponding tolerance.

The rate of change of the relative rotor angle provides an indication for rapidly occurring differences and changes to the operability of the generator or generator system, such that a high temporal resolution may be provided for the outputting of the signal. In other words, if a sudden change in the relative rotor angle is determined, a safety chain may be immediately enabled and/or a grid may be decoupled from the generator or generator set so as to avoid damage.

In addition, the relative rotor angle may also gradually increase in such manner that the predefined angle change threshold is not exceeded, i.e. the rate of change is below the threshold set for outputting the signal. Depending on the generator or generator set, the requirements of the grid code, and/or the actual operating state, an allowable absolute relative rotor angle may also be predefined, which should not be exceeded to ensure operational stability of the generator.

Accordingly, a signal may furthermore be output if the relative rotor angle exceeds a predefined absolute angle threshold, wherein said angle threshold is between 10 degrees and 150 degrees. Preferably, said angle threshold is between 80 degrees and 120 degrees, in particular about 100 degrees, which has been found to be particularly advantageous as an absolute threshold or threshold range.

The signal may hence be output when a rate of change of the relative rotor angle exceeds the predefined angle change threshold, e.g. during normal operation, or when a predefined absolute angle threshold is exceeded, which may occur during normal operation, but may also be dependent on the operating state.

In order to reduce potential noise in the voltage measurement received from the auxiliary winding and improve the accuracy of determining a potentially occurring pole slip, the voltage measurement may be corrected prior to the zero cross detection using a first level filter. The first level filter may provide a correction of signal fluctuations that are considered not to be present in an ideal signal, such that the received voltage measurement may be corrected or smoothened. For example, a signal averaging may be provided for two or more subsequent measurement values, e.g. as a moving average, so as to reduce any outliers and reduce the occurrence of fluctuations around the zero detection. Accordingly, the occurrence of multiple zero crossings about the same time point may be reduced, thereby increasing the reliability of the voltage measurement and the determined relative rotor angle.

Preferably, the first level filter is a low-pass filter having a predefined cut-off frequency so as to reduce occurring high frequency harmonics. Such harmonics may be caused e.g. by currents generated by an automated voltage regulator, which may be present in the generator and/or may be electrically or communicatively coupled to the auxiliary winding. The cut-off frequency may be set to provide a smoothening of a jagged signal and e.g. be based on simulated data and/or controlled operating conditions of the generator in such manner that only a single zero crossing occurs about a time point in the presence of such high frequency harmonics.

The first level filter may also define a filter time constant, wherein said filter time constant is less than one fifth, preferably less than one tenth, of an acceleration time constant of the generator.

Since the acceleration may be essentially considered as a constant due to the large inertia, the filter time constant may have an accuracy and temporal resolution based on said acceleration, such that an angle change exceeding the angle change threshold may still be determined. In other words, a level of smoothening and signal optimization may be defined by the predefined angle change threshold, a given inertia and corresponding acceleration time constant, and a given computational capacity.

Whereas the rotor of the generator generally comprises multiple main windings, typically three main windings, which provide a corresponding number of phase changes and zero crossings at a given time point, the auxiliary winding may be configured to provide a single phase. Therefore, the temporal resolution of the voltage measurement obtained from the auxiliary winding may be lower.

In order to provide a comparison of the rotor angles of the auxiliary winding and the main windings at one or more time points between detected zero crossings of the auxiliary winding, the zero cross points may be evaluated as a sequence of 0 degrees, 180 degrees, and 360 degrees phase positions of the rotor, wherein sampling points between zero cross points are linearly interpolated from 0 degrees to 180 degrees and from 180 degrees to 360 degrees.

The interpolation hence provides assumed or estimated values for the auxiliary winding, such that a relative rotor angle may be determined based on intermediate time points between the zero crossings and the temporal resolution of the determined relative rotor angle is not limited by the time points corresponding to the zero cross point detections.

The voltage measurement may be obtained from a single auxiliary winding, wherein the auxiliary winding is preferably a dedicated auxiliary winding for detecting the onset of a pole slip or wherein the auxiliary winding preferably provides a power supply to an automatic voltage regulator of the generator.

The single auxiliary winding provides that the implementation of the method on a generator may be facilitated and simplified. The fitting of a single auxiliary winding furthermore also facilitates retro-fitting on existing generators. In this regard, an automated voltage regulator may already be present on an existing generator and may include an individual winding as a power supply. In such case, the voltage measurement may be additionally used for the determining of a corresponding voltage phase as a basis for the determining of a relative rotor angle.

A dedicated auxiliary winding may improve the signal to noise ratio in the absence of an electrical coupling to a controller or automated voltage regulator. Frequency harmonics associated with currents of an automated voltage regulator may e.g. be effectively reduced or even avoided by proper electrical isolation. It will be understood that even in the presence of an individual winding for an automated voltage regulator, an additional dedicated auxiliary winding for the prediction of a pole slip may be implemented in order to improve the accuracy and resolution of said prediction and/or reduce required signal optimizations.

In case of larger fluctuations of the voltage measurement obtained from the auxiliary winding, a smoothening of the voltage measurement signal may not be desirable, as this may blend out signal values that are potentially relevant for the generator or generator set as a whole and/or may result in a distorted measurement. The occurrence of multiple zero cross points about the same time point, however, may result in inconsistencies with regard to the interpolation step, such that the determined relative rotor angle may not correspond to the actual state.

Accordingly, the zero cross points may be corrected using a second level filter prior to the interpolation, wherein the second level filter defines a temporal threshold between subsequent zero cross points, wherein a detected zero cross point exceeding said threshold is removed or causes the outputting of the signal.

For example, the second level filter may define a temporal threshold enabling the detection of a fault ride through and/or a rate of change of frequency, such that corresponding safety mechanisms that are present for such conditions may remain implemented and active. The threshold may also include a lower threshold and an upper threshold and/or may define a threshold interval. Zero crossing detections falling within a predefined time window may e.g. be removed or cause the signal to be output.

This is particularly advantageous, when about a single time point multiple zero crossings are detected due to e.g. a jagged voltage measurement signal extending beyond the zero voltage axis. A time between two subsequent zero crossings that is within a threshold interval after the prior zero crossing, e.g. between 20 milliseconds and 40 milliseconds, may be indicative for such jagged signal and potential erroneous measurement, such that the latter zero crossing may be filtered out or may cause the signal to be output. The upper threshold, e.g. of a threshold interval, may be chosen so as to be less than an expected time for a subsequent zero crossing based on a known or determined phase length.

Preferably, the signal is a control signal for a safety chain protector of a main controller of the generator. Thereby, corrections may be enabled to the system that are no longer possible by an automated voltage regulator of the generator. For example, the operation of the generator may be adjusted or interrupted. It may furthermore be provided that the generator or generator set is decoupled from a connected grid so as to avoid any potential damage or outages.

Although the relative phase change of the main windings may be received or obtained, e.g. via an interface or separate control unit, the method preferably comprises that the relative phase change of the main windings is determined or calculated based on a received main windings voltage measurement. This may be enabled e.g. by Clarke transformations based on three phases of the main windings. Due to the larger number of phases, the relative phase change of the main windings may comprise a temporal resolution that is higher than the determined voltage phase of the auxiliary winding, which may comprise a single phase.

Based on the received main windings voltage measurement and a received current measurement an absolute rotor angle value may furthermore be determined, wherein the signal may be output, if the determined absolute rotor angle value exceeds a predefined threshold. Such safety mechanism based on the absolute rotor angle provides a level of redundancy and may either be provided in parallel or at predefined intervals, e.g. for monitoring purposes of the generator set.

Furthermore, a control unit for controlling a generator is suggested, comprising an interface for receiving, in a coupled state of the control unit and the generator, at least a voltage measurement from an auxiliary winding of the generator and comprising an evaluation unit in communication with the interface and configured to perform the method according to the invention.

The control unit may be a stand-alone control unit or may be formed as an integrated sub-component of e.g. a main controller of the generator. Furthermore, one or more components may be provided on a software or logic level. The control unit is preferably independent from an automated voltage regulator, but may alternatively be formed at least in part by a controller of the automated voltage regulator. For example, the interface may be shared with or provided by an interface of an automated voltage regulator and/or the evaluation unit may be provided as a sub-component of the controller of the automated voltage regulator. The signal to be output may then preferably be a control signal for a safety chain protector of a main controller of the generator, which is preferably output via the interface in the communicatively coupled state with the main controller.

Furthermore, a generator is suggested, comprising main windings and an electrically isolated auxiliary winding and comprising a control unit described above in accordance with the invention. The auxiliary winding may be mechanically coupled to the rotor in a manner that the main windings and the auxiliary winding essentially have the same rotational speed during normal operation, e.g. by means of a torque coupling. The generator may be part of a generator set and may accordingly include a prime mover and/or a grid coupling interface.

Preferably, the generator comprises a controller, wherein the auxiliary winding is configured to provide a power supply to the controller. For example, the controller may be an automated voltage regulator of the generator. The auxiliary winding hence has the advantage that the voltage measurement may be used to predict the occurrence of a pole slip while at the same time ensuring that the voltage and/or part of the generator may be controlled by powering the corresponding controller. Alternatively, the auxiliary winding may be a dedicated auxiliary winding for detecting the onset of a pole slip, wherein the evaluation unit is preferably configured to output the signal as a control signal to a safety chain protector of a main controller of the generator.

INDUSTRIAL APPLICABILITY

With reference to the Figures, a method for detecting an onset of a pole slip in a generator as well as a corresponding control unit and generator equipped with such control unit are suggested. The suggested method as mentioned above is applicable in a variety of generators and applications, such as large-scale grid generators, wherein pole slips may occur and potentially causing severe damage. The provision of a measurement from an electrically isolated auxiliary winding allows that rapid changes in the rotation angle of the rotor may be detected before the occurrence of a pole slip, such that the operational safety of the generator, e.g. a generator set, may be significantly increased. The method may be implemented also in existing generators, e.g. by providing a corresponding control unit and implementation of an auxiliary winding, wherein such auxiliary winding may be provided as a power supply winding for an automated voltage regulator or as a dedicated auxiliary winding. Accordingly, the controller and/or auxiliary winding may be provided as retrofit parts, which may be exchanged e.g. upon or prior to overhaul or prior to use of the generator.

The invention claimed is:

1. A method for detecting an onset of a pole slip in a generator, comprising the steps of:

detecting subsequent zero cross points from a voltage measurement received from said generator; and determining a voltage phase by interpolating said zero cross points, wherein the voltage measurement is received from an auxiliary winding of the rotor that is electrically isolated from the main windings of the rotor and wherein a relative rotor angle is determined based on the determined voltage phase of the auxiliary winding and a relative voltage phase change of the main windings, wherein a signal is output, when a relative rotor angle change is determined that exceeds a predefined angle change threshold.

2. The method according to claim 1, wherein the angle change threshold is a value between 0.5 degrees and 15 degrees per second, preferably between 3 degrees and 12 degrees per second, in particular between 5 degrees and 9 degrees per second and/or wherein the angle change threshold value per second is a predefined percentage of a steady-state relative rotor angle during normal operation of the generator, preferably between 1 percent and 40 percent, in particular between 15 percent and 30 percent.

3. The method according to claim 1, wherein a signal is furthermore output if the relative rotor angle exceeds a predefined absolute angle threshold, said angle threshold being between 10 degrees and 150 degrees, preferably between 80 degrees and 120 degrees.

4. The method according to claim 1, wherein the voltage measurement is corrected prior to the zero cross detection using a first level filter.

5. The method according to claim 4, wherein the first level filter is a low-pass filter having a predefined cut-off frequency so as to reduce occurring high frequency harmonics.

6. The method according to claim 4, wherein the first level filter defines a filter time constant, said filter time constant being less than one fifth, preferably less than one tenth, of an acceleration time constant of the generator.

7. The method according to claim 1, wherein the zero cross points are evaluated as a sequence of 0 degrees, 180 degrees, and 360 degrees phase positions of the rotor and wherein sampling points between zero cross points are linearly interpolated from 0 degrees to 180 degrees and from 180 degrees to 360 degrees.

8. The method according to claim 1, wherein the voltage measurement is obtained from a single auxiliary winding, wherein the auxiliary winding is preferably a dedicated auxiliary winding for detecting the onset of a pole slip or wherein the auxiliary winding preferably provides a power supply to an automatic voltage regulator of the generator.

9. The method according to claim 1, wherein the zero cross points are corrected using a second level filter prior to the interpolation, the second level filter defining a temporal threshold between subsequent zero cross points, wherein a detected zero cross point exceeding said threshold is removed or causes the outputting of the signal.

10. The method according to claim 1, wherein the signal is a control signal for a safety chain protector of a main controller of the generator.

11. The method according to claim 1, wherein the relative phase change of the main windings is determined based on a received main windings voltage measurement.

12. The method according to claim 11, wherein based on the received main windings voltage measurement and a received current measurement an absolute rotor angle value is determined and the signal is output, if the determined absolute rotor angle value exceeds a predefined threshold.

13. A control unit for controlling a generator, comprising an interface for receiving, in a coupled state of the control unit and the generator, at least a voltage measurement from an auxiliary winding of the generator and comprising an evaluation unit in communication with the interface and configured to perform the method according to claim 1.

14. A generator, comprising main windings and an electrically isolated auxiliary winding and comprising a control unit according to claim 13.

15. The generator according to claim 14, wherein the generator comprises a controller, preferably an automated voltage regulator, and wherein the auxiliary winding is configured to provide a power supply to the controller, or wherein the auxiliary winding is a dedicated auxiliary winding for detecting the onset of a pole slip, wherein the evaluation unit is preferably configured to output the signal as a control signal to a safety chain protector of a main controller of the generator.

* * * * *